US007046593B2

(12) United States Patent
Ito

(10) Patent No.: US 7,046,593 B2
(45) Date of Patent: May 16, 2006

(54) OPTICAL DISK APPARATUS AND METHOD FOR ADJUSTING TILT BASED ON OPTICAL DISK TYPE

(75) Inventor: Masamichi Ito, Fujisawa (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 573 days.

(21) Appl. No.: 10/300,716

(22) Filed: Nov. 19, 2002

(65) Prior Publication Data

US 2003/0099171 A1  May 29, 2003

(30) Foreign Application Priority Data

Nov. 28, 2001  (JP)  .............................. 2001-362247

(51) Int. Cl.
*G11B 7/00* (2006.01)
(52) U.S. Cl. .................................... 369/44.32; 369/272
(58) Field of Classification Search ............. 369/44.32, 369/272
See application file for complete search history.

(56) References Cited

U.S. PATENT DOCUMENTS

| 4,866,688 | A | * | 9/1989 | Ohtake et al. | ............ | 369/44.13 |
| 5,523,989 | A | * | 6/1996 | Ishibashi | ................. | 369/44.32 |
| 5,970,035 | A | * | 10/1999 | Ohmori et al. | ............ | 369/53.2 |
| 6,044,048 | A | * | 3/2000 | Oinoue et al. | ............ | 369/44.23 |
| 6,151,174 | A | * | 11/2000 | Hendriks | ................. | 369/53.19 |
| 6,928,035 | B1 | * | 8/2005 | Komma et al. | ........... | 369/44.37 |
| 2002/0067672 | A1 | | 6/2002 | Yanagawa et al. | | |

FOREIGN PATENT DOCUMENTS

| JP | 08-293126 | 11/1996 |
| JP | 09-190639 | 7/1997 |
| JP | 2000-242951 | 9/2000 |
| JP | 2001-118274 | 4/2001 |

* cited by examiner

Primary Examiner—Gautam R. Patel
(74) Attorney, Agent, or Firm—Townsend and Townsend and Crew LLP

(57) ABSTRACT

An optical disk apparatus configured to be compatible with a plurality of disk types includes an objective lens to focus a laser beam onto an optical disk provided in the apparatus. A drive mechanism is coupled to the objective lens to enable tilting of the objective lens to a plurality of tilt angles. A first signal detection circuit is configured to receive and process a first information signal associated with information read from the optical disk and to output a data signal derived from the first information signal. A second signal detection circuit is configured to receive and process a second information signal associated with information read from the optical disk and to generate a first track error signal. A third signal detection circuit is configured to receive and process a third information signal associated with information read from the optical disk and to generate a second track error signal. A digital signal processor is coupled to the first, second, and third signal detection circuits and is configured to determine a disk type of the optical disk and perform a first tilting technique on the lens if the optical disk is determined to be a first disk type, a second tilting technique on the lens if the optical disk determined to be a second disk type, and a third tilting technique if the optical disk is determined to be a third disk type.

6 Claims, 10 Drawing Sheets

FIG.3
(a)
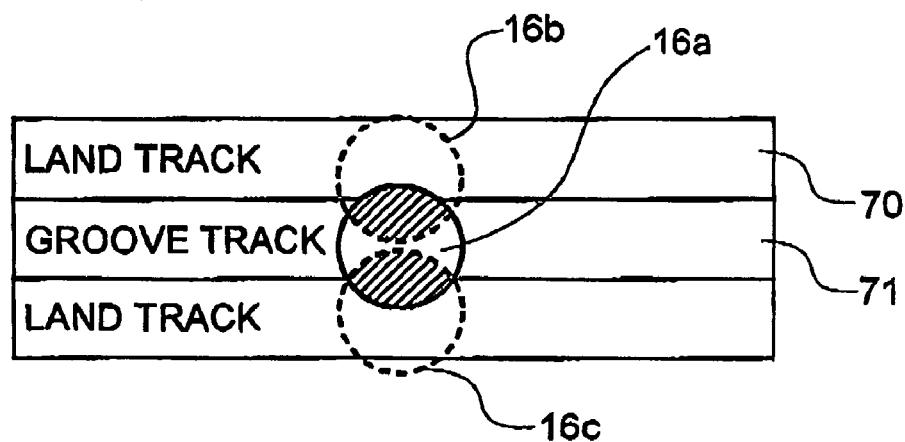
(b)
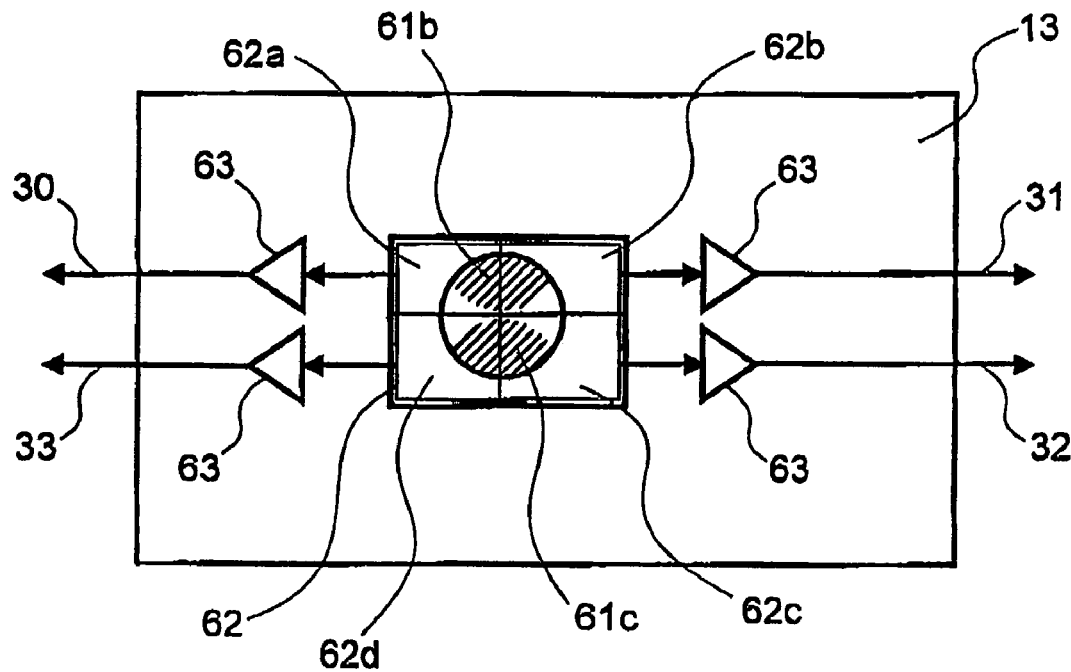

FIG.4
(a)
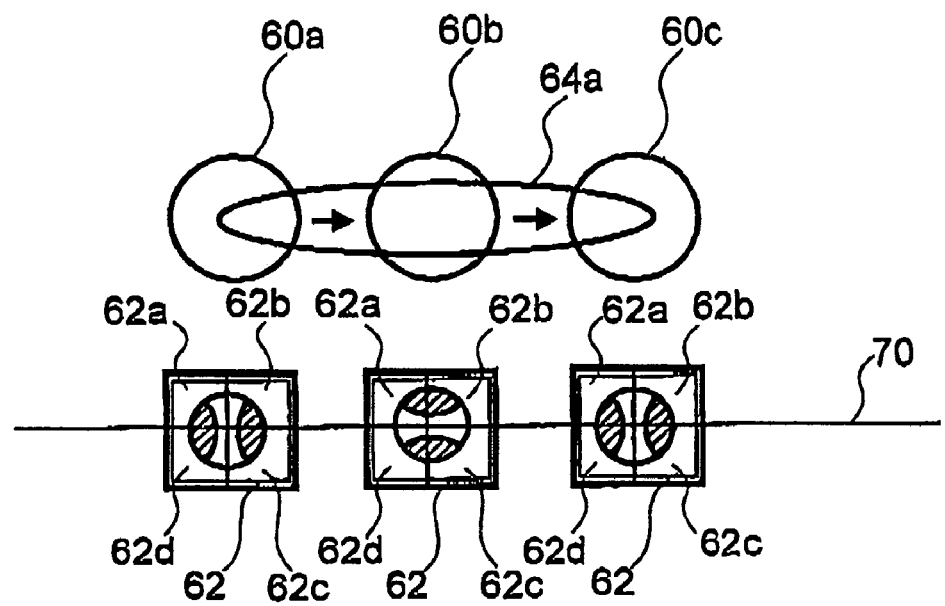
(b)
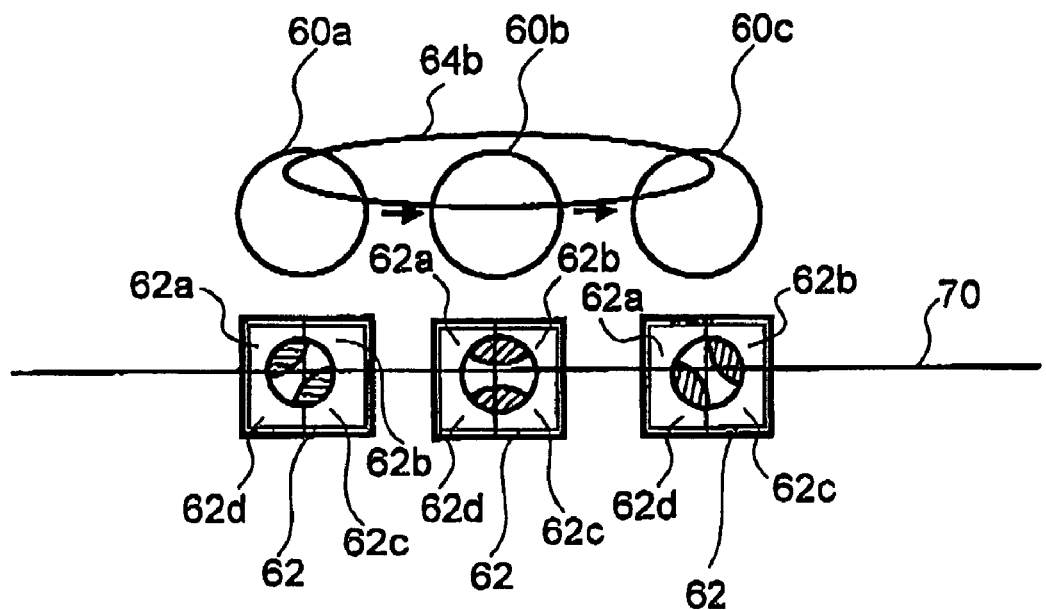

OPTICAL DISK APPARATUS AND METHOD FOR ADJUSTING TILT BASED ON OPTICAL DISK TYPE

CROSS-REFERENCES TO RELATED APPLICATIONS

The present application is related to and claims priority from Japanese Patent Application No. 2001-362247, filed on Nov. 28, 2001.

BACKGROUND OF THE INVENTION

The present invention relates to an optical disk apparatus for recording or reproducing information.

The performance of computers has been significantly enhanced in recent years, enabling them to handle various data such as text data, audio data, still image data, and moving image data. To accommodate these types of data, various types of optical disks have been developed and become widely used, meeting the application and required performance of the computers and the forms of data to be handled. For example, optical disks having a diameter of 12 cm are classified into two main types: the CD (Compact Disk) originally developed to distribute music data; and the DVD (Digital Versatile Disk/Digital Video Disk) developed to handle various data in an integrated manner. There are many types of CDs, such as the CD-ROM, CD-R, and CD-RW, and DVDs such as the DVD-ROM, DVD-RAM, DVD-R, and the DVD-RW.

In a reproduction-only CD-ROM or DVD-ROM, information is recorded as a series of pits having convex/concave shapes along a track to be scanned with a light spot. In a recordable optical disk such as a CD-R, CD-RW, DVD-R, and DVD-RW, the track is formed in a groove shape, and a light spot scans the track to record or reproduce information. In the DVD-RAM, the width of each groove and the width of each land between the grooves are substantially equal to each other, utilizing both the groove and the land as tracks in a land/groove structure.

DVDs have a track pitch of 0.74 µm narrowed from the CD track pitch of 1.6 µm, and a surface recording density approximately 7 times as high as that of CDs due to an increase in the linear density. In order to record/reproduce such high-density data, an optical disk apparatus for DVDs has an NA (numerical aperture) of 0.6 and a laser wavelength $\lambda$ of 660 nm changed from 0.45 and 780 nm, respectively, employed by an optical apparatus for CDs, so as to reduce the size of the light spot.

Each information-recording surface of an optical disk is covered with a transparent substrate to protect the surface against damage and dust. DVDs have a substrate thickness of 0.6 mm, while CDs have a substrate thickness of 1.2 mm. The laser beam is converged by an objective lens through the substrate and irradiated onto the information-recording surface as a small spot. Therefore, if the optical disk is tilted with respect to the objective lens, a coma aberration occurs with the focused beam, asymmetrically distorting the light spot. The coma aberration is proportional to the substrate thickness and the tilt angle of the disk and the third power of the NA (numerical aperture), and inversely proportional to the wavelength. This means that with the same disk tilt angle, DVDs have a coma aberration 40% larger than that of CDs. Furthermore, since DVDs have a track pitch narrower than that of CDs, their information reproduction performance is significantly deteriorated by inclination of the optical disk relative to the objective lens.

In order to reduce the deterioration of reproduction performance resulting from inclination of a disk, various techniques for reducing the influence of the tilt of an optical disk, performed each time the disk is set in place, have been proposed in addition to lens tilt adjustment carried out at the time of production of the apparatus. For example, Japanese Patent Laid-open No. 09-190639 (1997) discloses an optical disk apparatus using a tilt actuator that tilts the entire optical pickup having a tilt sensor attached thereto for measuring the angle of the disk.

On the other hand, the 4.7 GB DVD-RAM disk has a structure in which track groove regions are formed at intervals, and each prepit region is disposed in between to facilitate tilt detection. Japanese Patent Laid-open No. 2000-242951 discloses a technique for detecting a tilt error using the above structure.

Japanese Patent Laid-open No. 08-293126 discloses a method for adjusting the tilt so as to minimize the variation in the pulse width of an information reproduction signal obtained by the optical pickup.

Furthermore, Japanese Patent Laid-open 2001-118274 discloses a method which is used for optical disks having strait grooves and wobbled grooves and which obtains the difference between the amplitudes of wobble signals obtained on an inner circle and an outer circle of a disk, using the difference as a tilt error signal.

BRIEF SUMMARY OF THE INVENTION

The system for tilting an entire optical pickup, described above as a prior art technique, is a stable system capable of preventing the deterioration of reproduction performance due to inclination of a disk without producing misalignment of the optical system. However, the apparatus size needs to be increased to accommodate the mechanism for tilting the entire optical pickup.

A special technique for reducing a disk tilt and a special optical disk apparatus using the technique have been developed for each of the various types of optical disks described above at the same time. However, it is expensive to configure a single optical disk apparatus to incorporate all of the above special tilt reducing techniques or a plurality of optical disk apparatuses each dedicated for one of the above special tilt reducing techniques. Furthermore, the use of an optical disk apparatus dedicated for each tilt reducing technique is not suitable for notebook personal computers, etc., since the number of external apparatuses to be connected to the computer increases. Therefore, it is necessary to develop both a disk tilt reducing technique supporting many types of optical disks and an optical disk apparatus using the technique. Each of the above disk tilt reducing techniques, however, is dedicated for a corresponding optical disk, and is not designed to support many types of optical disks. Thus, the problem with the prior art disk tilt reducing techniques is that no disk tilt reducing technique is available which is compatible with many types of optical disks.

One embodiment of the present invention relates to an optical disk apparatus for concentrating a laser beam into a small light spot and irradiating it onto an optical disk which is an information recording medium so as to optically record or reproduce information in order to solve the above problem. The present embodiment provides a tilt reducing technique capable of making optimum corrections on the tilt of various optical disk types.

In one embodiment, an optical disk apparatus configured to be compatible with a plurality of disk types includes an objective lens to focus a laser beam onto an optical disk provided in the apparatus. A drive mechanism is coupled to the objective lens to enable tilting of the objective lens to a plurality of tilt angles. A first signal detection circuit is configured to receive and process a first information signal associated with information read from the optical disk and to output a data signal derived from the first information signal. A second signal detection circuit is configured to receive and process a second information signal associated with information read from the optical disk and to generate a first track error signal. A third signal detection circuit is configured to receive and process a third information signal associated with information read from the optical disk and to generate a second track error signal. A digital signal processor is coupled to the first, second, and third signal detection circuits and is configured to determine a disk type of the optical disk and perform a first tilting technique on the lens if the optical disk is determined to be a first disk type, a second tilting technique on the lens if the optical disk determined to be a second disk type, and a third tilting technique if the optical disk is determined to be a third disk type.

In another embodiment, an optical disk apparatus includes an objective lens to focus a laser beam onto an optical disk provided for the apparatus. A drive mechanism is coupled to the objective lens to enable tilting of the objective lens to at least two tilt angles. A first signal detection circuit is configured to receive and process a first information signal derived from reading information from the optical disk. A second signal detection circuit is configured to receive and process a second information signal derived from reading information from the optical disk. A digital signal processor is coupled to the first and second signal detection circuits and configured to receive a first control signal from the first signal detection circuit and a second control signal from the second signal detection circuit. The digital signal processor is configured to process the first control signal and tilt the lens by driving the drive mechanism if the optical disk is a disk of first type and to process the second control signal and tilt the lens by driving the drive mechanism if the optical disk is a disk of second type.

In another embodiment, an optical disk apparatus includes an optical pickup including an objective lens to focus a laser beam onto an optical disk provided for the apparatus, and a drive mechanism coupled to the objective lens to enable tilting of the objective lens. A sum signal detection circuit is configured to receive and process a plurality of information signals associated with information read from the optical disk, the detection signal circuit being configured to output a reflected light amount signal and a disk tilt selection signal, wherein the reflected light amount signal provides information about an amount of light reflected from the optical disk to the optical pickup. A push-pull signal circuit is configured to receive and process the plurality of information signals and output wobble and push-pull signals. A differential phase signal circuit is configured to receive and process the plurality of information signals and output a differential phase signal. A digital signal processor is configured to receive the reflected light amount signal, the disk tilt selection signal, the wobble signal, the push-pull signal, and the differential phase signal in order to determine a disk format of the optical disk from a plurality of disk formats. The digital signal processor uses the disk tilt selection signal to tilt the lens if the optical disk is determined to be a DVD-RAM disk, and the wobble and push-pull signals to tilt the lens if the optical disk is determined to be a DVD-R/DVD-RW disk that does not include data written in its information recording area by a user.

In yet another embodiment, a method of operating an optical disk apparatus includes providing an objective lens configured to focus light onto a disk provided for the apparatus, the disk being configured to store information thereon; determining a disk type of the disk from at least first, second, and third types of disks that are different from each other; performing a first tilt of the lens if the disk is determined to be the first disk type; performing a second tilt of the lens if the disk is determined to be the second disk type; and performing a third tilt of the lens if the disk is determined to be the third disk type.

In yet another embodiment, a computer readable medium provided in an optical disk apparatus, including an objective lens, includes code to determine a disk type of a disk provided for the apparatus from a plurality of predetermined disk types, code for performing a first tilting technique of the lens if the disk is determined to be a first disk type, code for performing a second tilting technique of the lens if the disk is determined to be a second disk type, and code for performing a third tilting technique of the lens if the disk is determined to be a third disk.

BRIEF DESCRIPTION OF THE DRAWINGS

FIG. 3, comprising FIGS. 3(a) and 3(b), illustrates a track error detecting method which uses a push-pull detecting method, wherein FIG. 3(a) shows the relationship between a disk groove in the data zone of a DVD-RAM and light spots, and FIG. 3(b) illustrates a configuration of a photodetector.

FIG. 4, comprising FIGS. 4(a) and 4(b), illustrates a track error detecting method which uses a DPD detecting method, wherein FIG. 4(a) shows the spot states of a light detecting element when a light spot is aligned to the center of a pit, and FIG. 4(b) shows the spot states of the light detecting element when the light spot is not aligned to the center of the pit.

FIGS. 6(a), 6(b), 6(c), and 6(d), illustrates a method for determining a disk type such as a CD disk or a DVD disk, wherein FIG. 6(a) shows the displacement of a lens, FIG. 6(b) shows a laser light emitting timing, FIG. 6(c) shows a total amount of reflected light from a DVD disk, and FIG. 6(d) shows a total amount of reflected light from a CD disk.

FIGS. 8(a), 8(b), and 8(c), illustrates a method for determining the tilt of a DVD disk, wherein FIG. 8(a) shows VFO prepits, FIG. 8(b) shows the voltage of the prepit portion with no tilt, and FIG. 8(c) shows the voltage of the prepit portion in the case of occurrence of a tilt error.

DETAILED DESCRIPTION OF THE INVENTION

Figure 1:
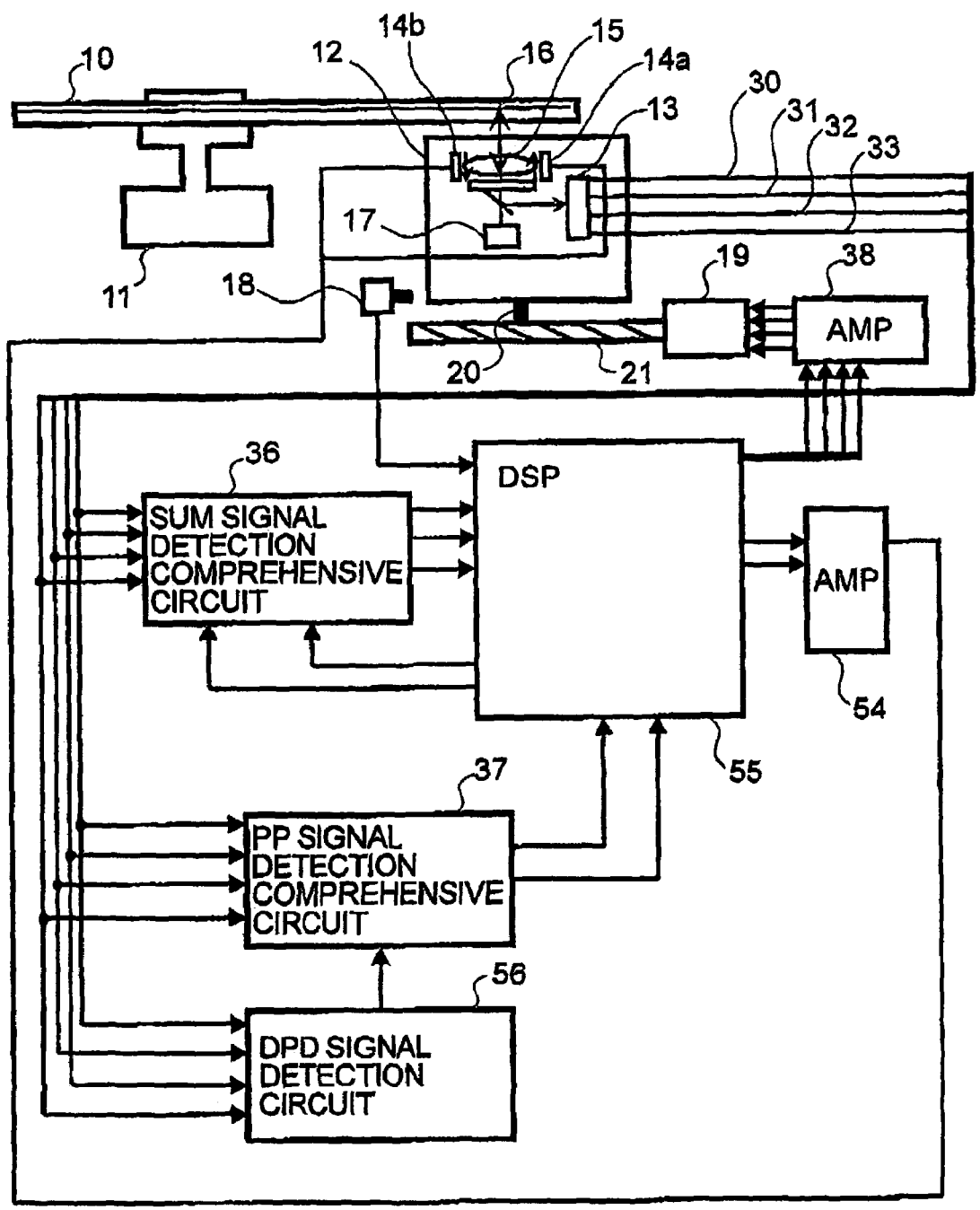
FIG. 1 is a schematic block diagram showing an optical disk apparatus according to an embodiment of the present invention.

FIG. 1 is a schematic block diagram showing an optical disk apparatus according to one embodiment of the present invention. In the figure, reference numeral 10 denotes an optical disk, and numeral 11 denotes a spindle motor. The optical disk 10 is attached to the spindle motor 11 and rotated. Reference numeral 12 denotes an optical pickup for recording/reproducing information to/from the disk. Reference numeral 19 denotes a stepping motor; numeral 20 a pin fixed to the optical pickup 12; and numeral 21 a shaft of the stepping motor 19 in which a helical groove is formed thereon. The stepping motor 19, the pin 20, and the shaft 21 collectively constitute an advance mechanism for the optical pickup 12. The pin 20 is inserted in the groove of the shaft 21 so that the pin 20 can be moved along the groove. The stepping motor 19 causes the shaft 21 to rotate. As the shaft 21 rotates, the position of the pin 20 in the groove moves radially with respect to the disk, moving the pickup 12 in the same direction. This advance mechanism makes it possible to transfer the optical pickup 12 to any radial position over the optical disk 10. When the optical pickup 12 has reached the innermost circular position of the optical disk, the optical pickup 12 presses a switch 18. The output signal of the switch 18 is detected by a DSP (digital signal processor) 55, which then stops the rotation of the stepping motor 19. With the above operation, the optical pickup 12 can be positioned at the innermost circular position of the optical disk 10. In addition, since the stepping motor 19 is supplied with a pulse signal transmitted from the DSP 55 and amplified by an amplifier (AMP) 38, the stepping motor 19 rotates precisely according to the number of pulses included in the pulse signal sent from the DSP 55, making it possible to position the optical pickup 12 at any radial position of the optical disk 10 with precision.

The optical pickup 12 is made up of a semiconductor laser 17, an objective lens 15, a photodetector 13, etc. The light beam emitted from the semiconductor laser 17 is converged by the objective lens 15 into a light spot 16 and irradiated onto the information-recording surface of the optical disk 10. The optical beam reflected from the information-recording surface is converged by the objective lens 15 again and detected by the photodetector 13. The data on the optical disk 10 is read by detecting the change in the amount of the reflected light received by the photodetector 13. The error in the track direction is detected by observing the change in the distribution of the reflected light. The focus error is detected by observing how the reflected light is diverged.

The signals output from the photodetector are supplied, respectively, to a sum signal detection circuit 36 that outputs an amplitude detection signal, a push-pull (PP) signal detection circuit 37 that outputs a PP track error signal, and a differential phase (DPD) signal detection circuit 56 that outputs a differential phase (DPD) track error signal. On the other hand, when a drive signal for PWM (Pulse Width Modulation) has been generated by the DSP 55, the signal is amplified by an AMP 54 and supplied to coils 14a and 14b for a tilt adjustment, producing a current in the coils. These operations are described in more detail later.

Figure 2:
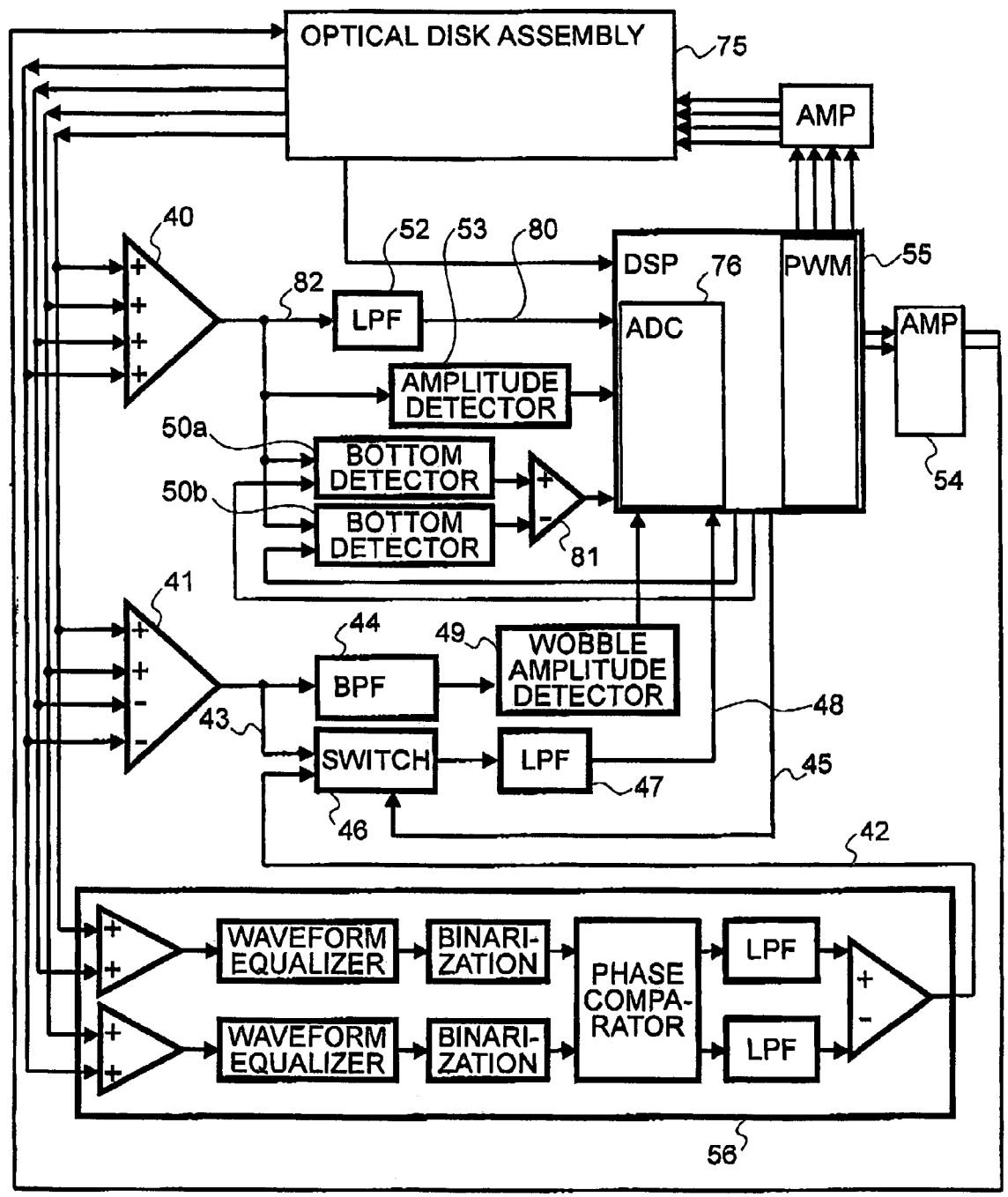
FIG. 2 is a block diagram showing a signal processing section included in the optical disk apparatus according to an embodiment of the present invention.

FIG. 2 is a block diagram showing a signal processing section included in the optical disk apparatus according to the present embodiment. In one embodiment, a first signal detection circuit, e.g., the circuit 36, includes an operation unit 40, a low pass filter (LPF) 52, an amplitude detector 53, a first bottom detector 50a, a second bottom detector 50b, and a differential amplifier 81. A second signal detection circuit, e.g., the circuit 37, includes an operation unit 41, a BPF 44, a switch 46, a wobble amplitude detector 49, and an LPF 47.

In the figure, reference numeral 75 denotes an optical assembly including the optical pickup 12. The optical pickup 12 includes the photodetector 13 having a four-terminal detector therein. A voltage is supplied from each of the light-detecting elements in the four-terminal detector. The supplied voltages (or information signals) are added together by the operation unit 40 to produce, through the LPF 52, a signal indicating the amount of the returned light. This signal (denoted by reference numeral 80) can be used to detect whether the focus servo has been activated, and is input to an ADC (analog-to-digital converter) 76 included in the DSP 55. The output from the operation unit 40 is input to the amplitude detector 53, which detects the amplitude of the recorded data from the output. The detected amplitude of the recorded data is input to the ADC 76 of the DSP 55. Furthermore, bottom detectors 50a and 50b obtain the bottom values for the first and second halves of the VFO region of a DVD-RAM disk. A disk tilt selection signal (or voltage difference signal) obtained as a result of calculating the difference voltage between the two bottom values by the use of the differential amplifier 81 is received by the DSP 55 through the ADC 76.

The voltages output from the four light detecting elements are also supplied respectively to the terminals of the operation unit 41, which operates on the voltages to produce a PP (push-pull) track error signal, that is, a PP signal 43, and inputs it to a switch 46.

Even if the output from the optical disk assembly 75 is a wobble signal, the operation unit 41 can detect it. Since the groove wobbles with a single frequency, the wobble signal has a single frequency. This wobble signal is subjected to noise reduction by a BPF (band-pass filter) 44 and then supplied to a wobble amplitude detector 49. The output of the wobble amplitude detector 49 is input to the ADC (analog-to-digital converter) 76 of the DSP 55 so that the DSP 55 can detect its maximum amplitude.

The output voltages of the four light detecting elements are also supplied to the DPD signal detection circuit 56. The DPD signal detection circuit 56 detects the phase differences between these voltages as track error signals and supplies them to the switch 46.

The DSP 55 operates the switch 46 using a signal 45 to selectively read either a DPD signal 42 or the PP signal 43 by the use of the ADC 76.

The driving force for the tilt actuator is generated by using the magnetic field of the permanent magnet shown in FIG. 1 and causing a current to flow through the coils 14a and 14b. When a PWM (Pulse Width Modulation) signal is generated from the DSP 55, the signal is amplified by the AMP 54 and supplied to the optical disk assembly 75 to cause a current to flow through the coils 14a and 14b.

A description will be made below of a method for detecting a track error with reference to FIGS. 3 and 4.

FIG. 3 is a diagram for illustrating a track error detecting method using a push-pull detecting method. FIG. 3(a) shows the relationship between a disk groove in the data zone of a DVD-RAM and light spots, while FIG. 3(b) is a diagram showing a configuration of a photodetector.

FIG. 3 shows the relationship between a disk groove of an optical disk and light spots in the case of the DVD-RAM. Each disk groove of the DVD-RAM includes a land track 70 and a groove track 71. The groove track 71 and the land track 70 have the same width, which is a structure specific to DVD-RAMs. DVD-R disks and DVD-RW disks also have a structure employing grooves. The dimensions of their grooves are different, however. Therefore, the push-pull detecting method can be used for the data zone of each of the DVD-RAM, DVD-R, and DVD-RW disks. The groove structure in the surface of each disk acts as a diffraction grating such that the reflected light from the disk is divided into a zero order light 16a, a positive first order light 16b, and a negative first order light 16c as a result of the diffraction. Even though some of the positive first order light 16a and the negative first order light 16b reflected from the disk enters into the objective lens, some other does not and is dropped. That is, the zero order light 16a and portions of the positive first order light 16a and the negative first order light 16b overlapping the zero order light 16a are input to a four-terminal detector 62.

In the photodetector 13 shown in FIG. 3(b), both an amount of light in the overlap 61b between the zero order light and the positive first order light (in the upper half of the spot) and an amount of light in the overlap 61c between the zero order light and the negative first order light (in the lower half of the spot) vary due to interference with the zero order light. They are affected by the interference such that: when the spot is at the center of the groove, the amount of light in the overlap 61b is equal to that in the overlap 61c; and when the spot is shifted from the center of the groove, the amount of light in each overlap changes in proportion to the shift of the light spot from the center of the groove. That is, the shift of the light spot towards a first direction (e.g., upward) increases the amount of light in the overlap 61b, whereas the shift of the light spot towards a second direction (e.g., downward) increases the amount of light in the overlap 61c. By utilizing this principle, the amounts of light are converted into voltages 30, 31, 32, and 33 by use of a four-terminal photodiode for converting an amount of received light into a current and an IV amplifier 63 for converting a current into a voltage. Then, the operation unit 41 shown in FIG. 2 calculates the expression "(voltage 30+voltage 31)−(voltage 32+voltage 33)" to produce a track error signal (PP signal).

As for the wobble signal, since it is produced by the wobbled groove, this wobbling state remains the same even when the track is shifted from the spot in the push-pull detecting method. Therefore, the operation unit 41 shown in FIG. 2 can detect the wobble signal. Since the groove wobbles with a single frequency (i.e., the grooves are provided at uniform intervals), the wobble signal has a single frequency. The wobble signal is subjected to noise reduction by the BPF (band-pass filter) 44 shown in FIG. 2. In tilt adjustment in which the amplitude of the wobble signal is maximized, it is necessary to detect the amplitude. To do this, the output signal of the BPF 44 is input to the wobble signal amplitude detection circuit 49 (see FIG. 2), whose output is input to the ADC 76 of the DSP 55. With this arrangement, the DSP 55 can detect the amplitude.

The total amount of reflected light is obtained by the use of the expression "voltage 30+voltage 31+voltage 32+voltage 33", and is detected by the operation unit 40. The detected total amount is input to the ADC through the LPF (low-pass filter) 52 for further processing by the DSP 55.

FIG. 4 is a diagram for illustrating a track error detecting method using a DPD detecting method. FIG. 4(a) illustrates the spotting states of a light-detecting element when the light spot is run right over a pit. FIG. 4(b) illustrates the spotting states of the light-detecting element when the light spot is run through positions shifted from the center of the pit. FIGS. 4(a) and 4(b) show a light spot 60 irradiated to a pit 64 at three representative positions and the resulting light amount distributions on the surface of a detector 62. The four detection signals of the four light detecting elements of the photodetector 62 are denoted by reference numerals 62a, 62b, 62c, and 62d.

As shown in FIG. 4(a), when the light spot 60 is irradiated aligned to the center of [correct?] a pit 64a, as indicated by light spots 60a, 60b, and 60c in the figure, the obtained light amount distributions are each symmetrical about the division line 70 of the detector 62. Therefore, the sum of the detector detection signals 62a and 62c and the sum of the detector detection signals 62b and 62d are in phase with each other.

As shown in FIG. 4(b), when the light spot 60 is irradiated without being aligned to the center of a pit 64b, as indicated by light spots 60a, 60b, and 60c in the figure, the light amount distributions in the edge portions of the pit, such as those in the light spots 60a and 60c, are not symmetrical about the division line 70. Accordingly, the sum of the detector detection signals 62a and 62c and the sum of the detector detection signals 62b and 62d are not in phase with each other. The DPD signal detection circuit 56 shown in FIG. 2 detects the phase difference between the sum of the voltages 30 and 32 and the sum of the voltages 31 and 33 as a track error signal. The DSP 55 shown in FIG. 2 operates the switch 46 using the signal 45 to selectively read either the DPD signal 42 or the PP signal 43 by the use of the ADC 76.

Referring to FIG. 1, the driving force for the tilt actuator is generated by using the magnetic field of the permanent magnet and causing a current to flow through the coils 14a and 14b. The coils 14a and 14b are connected with the objective lens. When a PWM (Pulse Width Modulation) signal is generated by the DSP 55, the signal is power-amplified by the AMP 54 to cause a current to flow through the coils 14a and 14b. The current in the coils 14a and 14b is controlled by a setting register within the DSP 55. The output PWM signal is obtained as a result of filtering a read signal from the ADC 76. When the current flows in the coils 14a and 14b, the forces indicated by the arrows are produced by the magnetic field of the permanent magnet. When a force is generated in the coil 14a in a direction toward the disk, a force in a direction away from the disk is generated in the coil 14b, and vice versa. That is, such an opposing forces are generated to tilt the objective lens.

Figure 5:
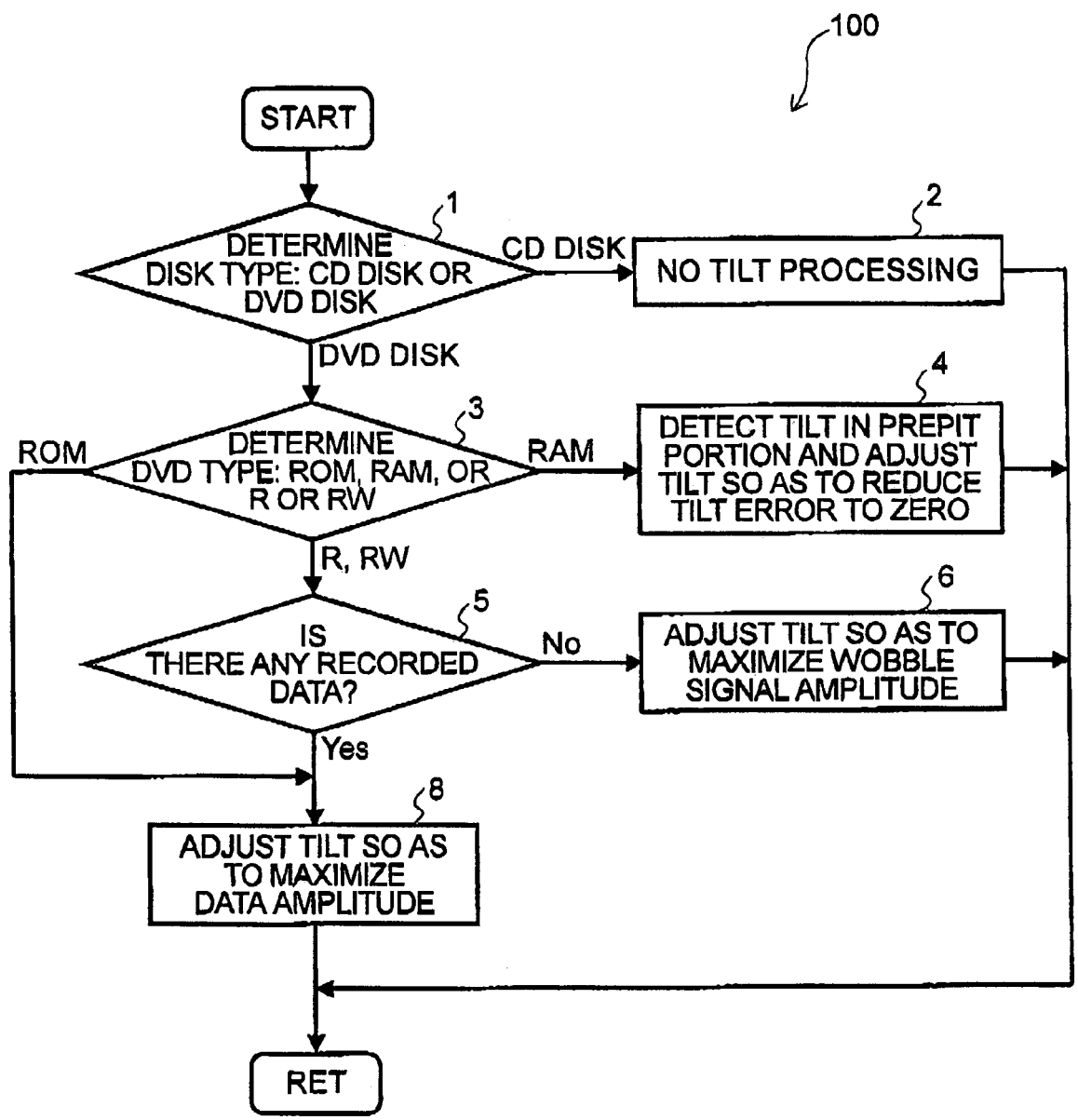
FIG. 5 is a flowchart for a tilt adjustment process performed by the optical disk apparatus according to one embodiment of the present invention.

FIG. 5 is a flowchart showing a tilt adjustment process 100 carried out by the optical disk apparatus according to the present embodiment. The optical disk apparatus according to the present invention supports CD disks or DVD disks. Since the tilt adjustment of DVD disks may cause a problem, it is first determined whether a target disk is a CD disk or a DVD disk at step 1. If it is determined that the target disk is a CD disk, the processing flow proceeds to step 2 at which the PWM output for tilt adjustment from the DSP 55 is prevented from being outputted.

If it is determined that the target disk is a DVD disk at step 1, it is further determined whether it is a DVD-ROM, a DVD-RAM, a DVD-R, or a DVD-RW. If it is determined that the target disk is a DVD-R or a DVD-RW, the process 100 proceeds to step 5 at which the existence of recorded data is checked. If the target disk is a DVD-ROM or the DVD-R or DVD-RW that has recorded data (e.g., the target disk is formatted), the processing flow proceeds to step 8 at which tilt adjustment is carried out to maximize the amplitude of the data. If it is determined that the DVD-R or the DVD-RW has no recorded data (e.g., the disk has not been formatted or no user-recorded data exists) at step 5, tilt adjustment is carried out to maximize the amplitude of the wobble signal at step 6. If it is determined that the target disk is a DVD-RAM at step 3, the processing flow proceeds to step 4 at which a tilt is estimated by processing the tilt detection signal output by the first signal detection circuit, and tilt adjustment is carried out so as to reduce the tilt error to zero. As used herein, this process may also be referred to as a tilt detection. The above adjustment is carried out so as to maximize the amplitude of the data, since it is considered that the reading resolution has been deteriorated due to the coma aberration generated by the tilt error. Thus, the tilt is optimized by adjusting the angle of the lens so that the data amplitude is maximized. As used herein, the term "optimized" or "optimization" refers to selection of one suitable option over another suitable option and does not refer to the best option.

Figure 6:
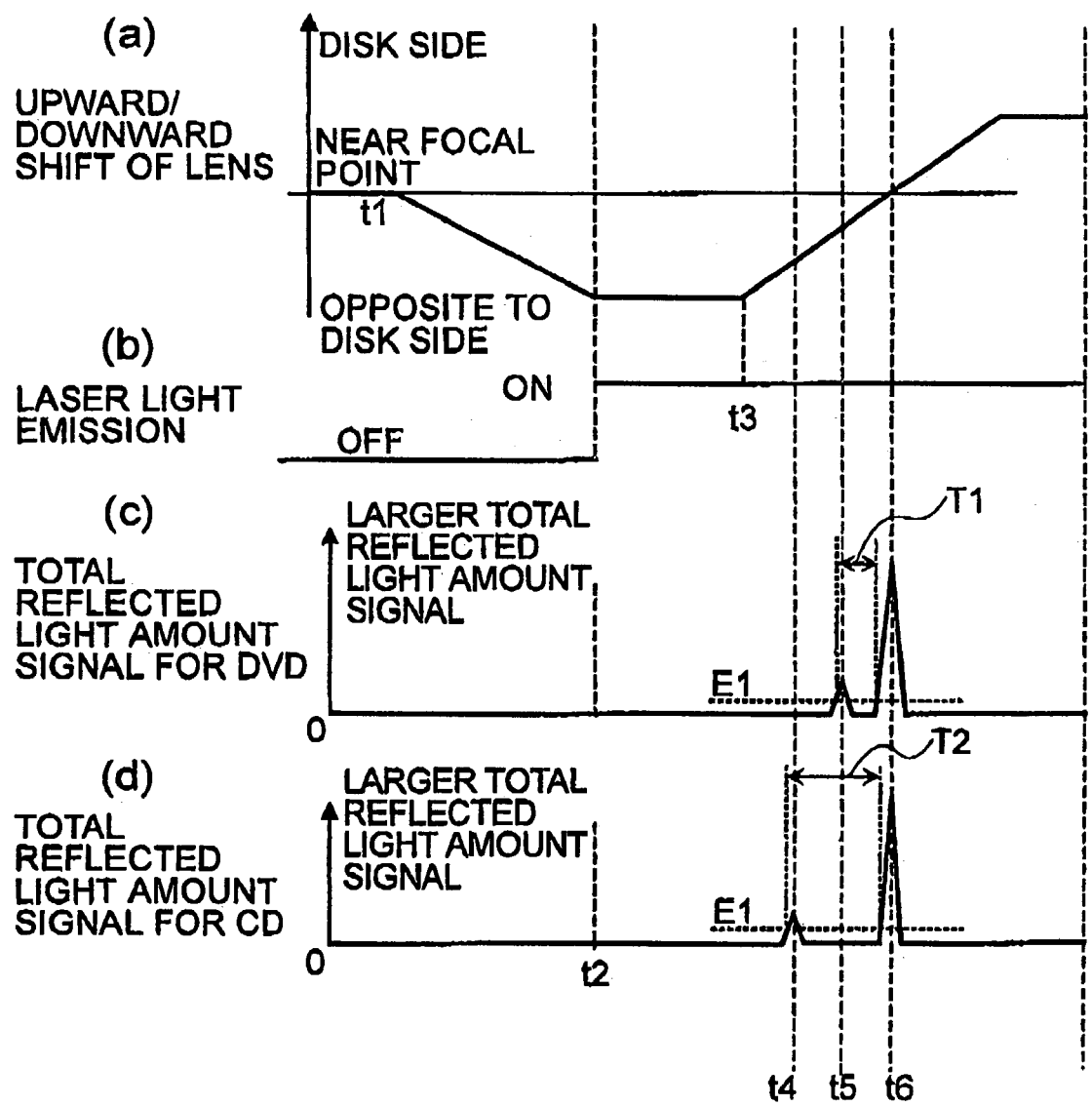
FIG. 6, comprising

FIG. 6 is a diagram to illustrate a method for determining the disk type (e.g., CD or DVD) of a target disk. FIG. 6(a) shows the displacement of a lens; FIG. 6(b) shows a laser light emitting timing; FIG. 6(c) shows a total amount of reflected light from a DVD disk; and FIG. 6(d) shows a total amount of reflected light from a CD disk. The horizontal axes in FIGS. 6(a) to 6(d) indicate time t. The method for determining a disk type measures the thickness of a disk to determine whether it is a CD disk or a DVD disk. CD disks have a thickness of 1.2 mm, while DVD disks have a thickness of 0.6 mm. Therefore, if a thin disk is detected, the disk is determined to be a DVD disk. In one embodiment, the thickness of an optical disk is determined by measuring a total amount of reflected light reflected from the disk and recording surfaces when the objective lens is moved at a constant speed.

Specifically, as shown in FIG. 6(a), the lens of the optical pickup is moved from near the focal point in a direction away from the optical disk, and at the lowest lens position, that is, at time t2, the laser is turned on so as to emit light as shown in FIG. 6(b). As shown in FIG. 6(b), the lens begins to be moved closer to the optical disk at a constant speed at time t2, when the DSP 55 starts to read a total reflected light amount signal 80 (see FIG. 2). Until the lens reaches the upper limit, the DSP 55 continues to read the signal 80 at sampling intervals. In the case of the DVD disk, as shown in FIG. 6(c), since light is reflected from the disk surface at time t5, the voltage (of the total reflected light amount signal) then is larger than the level E1 and, therefore, is read by the DSP 55. At time t6, the signal 80 from the recording surface is read. In the case of the CD disk, as shown in FIG. 6(d), the total reflected light amount signal is read at times t4 and t6. The DSP 55 processes the total reflected light amount data that has been read and measures the time interval T between the two points at which the voltage exceeds the slice voltage E1. In one embodiment, a predetermined time interval T1 (t6–t5) for the DVD disk and a predetermined time interval T2 (t6–t4) for the CD disk are used for the disk type determination. A reference time (interval) is set at (T1+T2)/2. If the measured time (interval) T is shorter than the reference time (interval), the optical disk inserted into the apparatus is determined to be a DVD disk. If the measured time (interval) T is longer than the reference time (interval, the optical disk is determined to be a CD disk.

Figure 7:
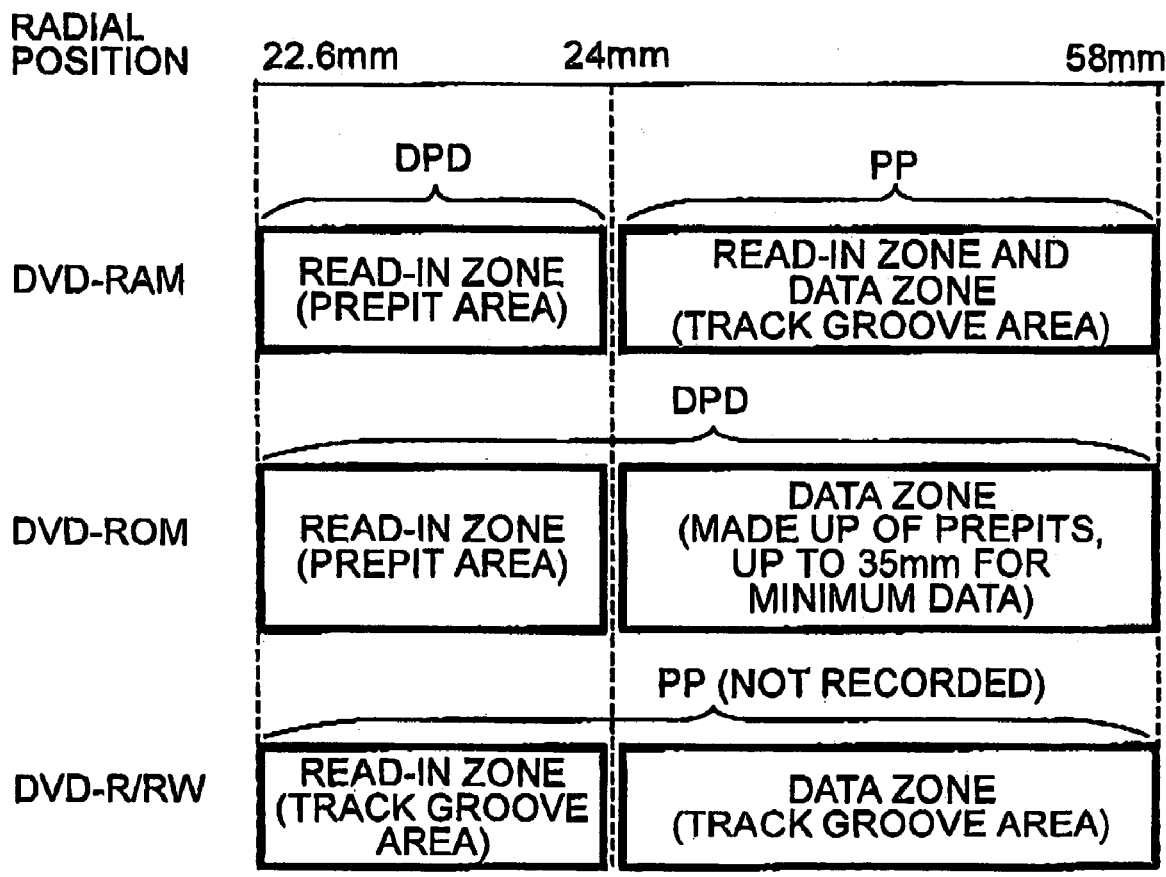
FIG. 7 is a diagram showing each radial position and the corresponding groove structure in a DVD disk.

FIG. 7 is a diagram showing a plurality of radial positions of a plurality of DVD disk types and the corresponding groove structures. In the DVD-RAM disk, the area inside the circle having a radius of 24 mm (hereinafter referred to as "the management area") is made up of prepits, and therefore a DPD signal can be detected from this area. Track grooves are formed in the area outside the circle having a radius of 24 mm (hereinafter referred to as "the information recording area"), and therefore a PP signal can be detected from this area. In the case of the DVD-ROM disk, since its entire area is made up of prepits, a DPD signal can be detected from both its management area and information recording area. In the case of the DVD-R disk or the DVD-RW disk, since its entire area has track grooves formed therein, a PP signal can be detected from the management and information recording areas before information is recorded in the information recording area. However, a DPD signal is also generated from the information recording area in recorded DVD-R and DVD-RW disks.

Accordingly, using these characteristics of DVD disks, it is possible to determine the DVD disk type by checking whether a PP signal can be detected from the area (management area) inside the circle having a radius of 24 mm and the area (information recording area) outside the circle. As shown in FIG. 1, since the optical pickup 12 can be moved in a radial direction with precision by use of the stepping motor 19 after its start position is corrected using the switch 18, it is possible to accurately move the pickup to the above two areas. Referring to FIG. 2, the switch 46 is operated by the signal 45 to select a PP signal output from the operation unit 41, and the PP signal is read through the ADC 76. The existence of a PP signal is determined as follows. The ADC 76 reads the signal a plurality of times; an average amplitude is obtained from the maximum and minimum values; and if the average amplitude is larger than a target amplitude, the signal is determined to be a PP signal.

Figure 8:
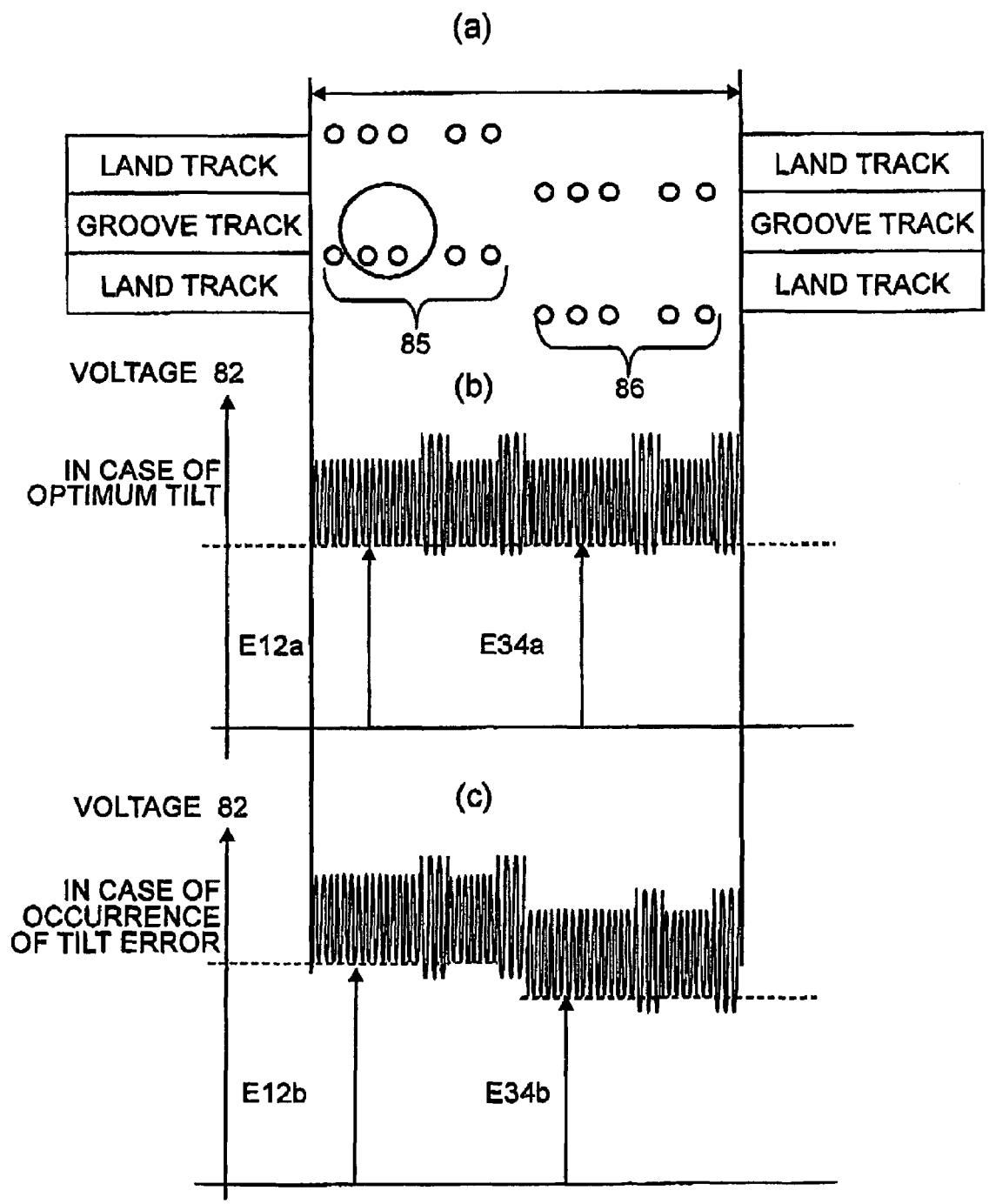
FIG. 8, comprising

A description will be made of tilt correction for DVD-RAMs. The DVD-RAM's data zone is the area inside the circle having a radius of 24 mm, and data is recorded or reproduced mainly using this area. Even though this area is a track groove area, the grooves are disposed at intervals in the DVD-RAM format, and prepit portions called headers, which indicate addresses, are arranged between the grooves. FIG. 8 shows a prepit portion in the data zone.

FIG. 8 is a diagram for illustrating a method for detecting the tilt of a DVD-RAM disk. FIG. 8(a) shows VFO prepits; FIG. 8(b) shows the voltage of the prepit portion with no tilt; and FIG. 8(c) shows the voltage of the prepit portion in the case of occurrence of a tilt error. The voltage of this prepit portion corresponds to the output voltage 82 of the operation unit 40 shown in FIG. 2. The prepit portion is divided into the two main portions: the VFO portion used for synchronization; and the portion for indicating address information. FIG. 8 shows only VFO prepits. The pits are disposed on the border between grooves and lands, and the first half 85 and the second half 86 of the prepit portion area are shifted from each other by one track.

With no disk tilt, the voltages E12a and E34a of the first half 85 and the second half 86, respectively, of the prepit portion are equal to each other, as shown in FIG. 8(b). With a disk tilt, on the other hand, the voltages are different from each other as indicated by the voltages E12b and E34b in FIG. 8(c). The disk tilt can be detected by calculating the expression "E12–E43". According to the specifications of the 4.7 GB DVD-RAM, the header portion can be detected at intervals of 0.74 ms. The bottom detectors 50a and 50b shown in FIG. 2 obtain the bottom values of the first half 85 and the second half 86 of the VFO area. A disk tilt detection signal, which is the voltage difference calculated by the differential amplifier 81, is received by the DSP 55 through the ADC 76. The disk tilt detection data is processed by a digital filter for phase lead adjustment within the DSP 55 to stabilize the servo and is output after it is subjected to PWM processing in order to drive the objective lens for tilt adjustment.

Figure 9:
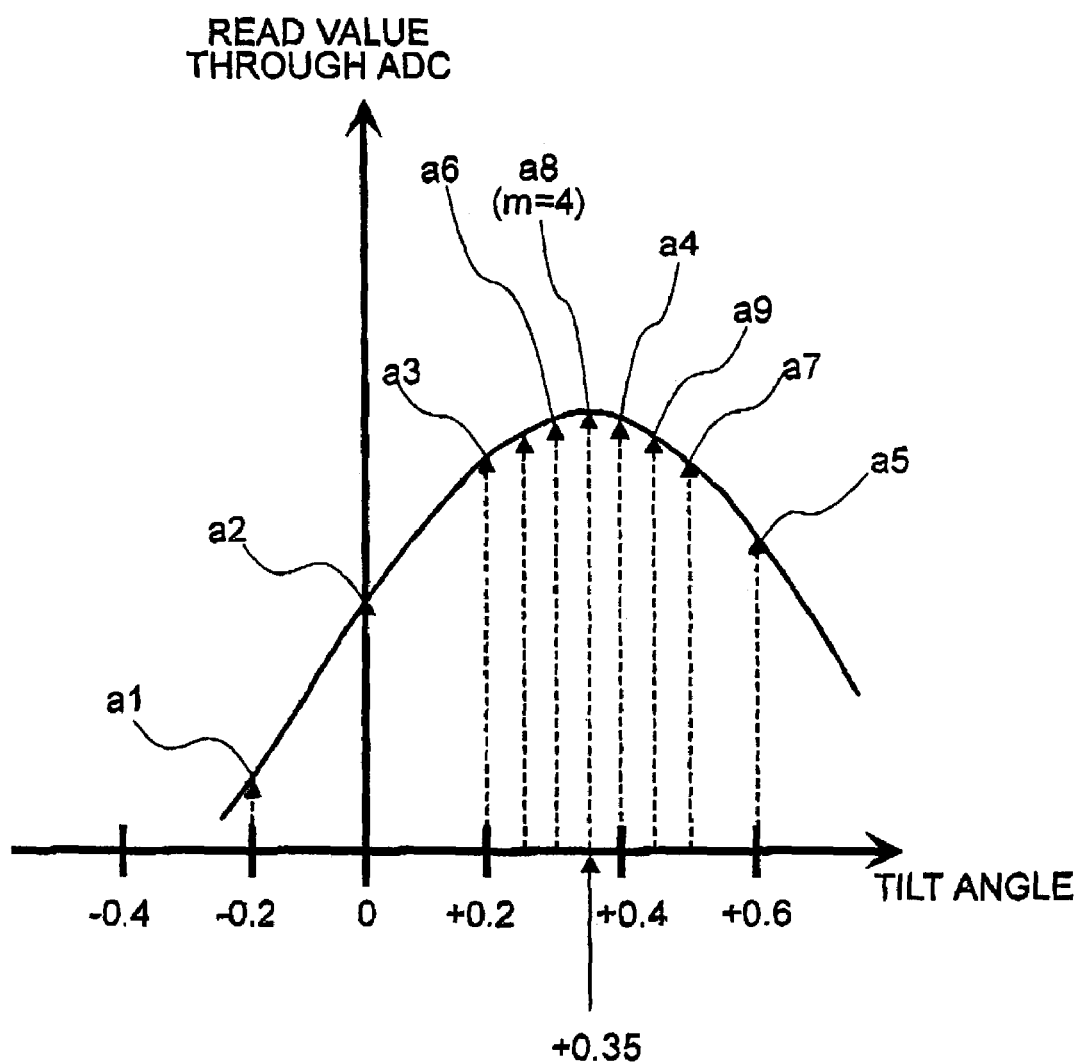
FIG. 9 is a diagram for illustrating a method for obtaining a maximum amplitude value.

FIG. 9 is a diagram for illustrating a method for obtaining a maximum amplitude value, wherein the horizontal axis indicates the angle of the lens, and the vertical axis indicates the value read by the ADC. The output of the wobble amplitude detector 49 shown in FIG. 2 indicates a wobble amplitude, which is input to the ADC 76 of the DSP 55. In addition, the amplitude detector 53 detects the amplitude of recorded data and inputs it to the ADC 76. The DSP 55 obtains the output of the amplitude detector 53 and the output of the wobble amplitude detector 49 through the ADC 76. The recorded data amplitude and the wobble signal amplitude with respect to the varying tilt of the objective lens are represented by an upside-down parabolic curve of FIG. 9. The horizontal axis in FIG. 9 indicates the set value (the tilt setting value) of the DSP 55 corresponding to the tilt angle (lens angle). The corresponding relationship between the tilt setting value and the angle of the objective lens can be obtained since the sensitivity of the tilt actuator is known beforehand. The same signal processing is carried out for each of the recorded data amplitude and the wobble signal amplitude read by the ADC 76. Therefore, a description will be made below of a process for detecting the maximum value from among the values received by the ADC 76.

FIG. 9 shows a case in which the tilt error is maximized at an angle of +0.35 degrees. The purpose here is to quickly find a tilt setting value that produces the maximum value with an accuracy of 0.05 degrees. The method employed by the present embodiment first finds the possible maximum values a3, a4, and a5 at intervals of 0.2 degrees, then finds the possible maximum values a3, a6, a4, and a7 at intervals of 0.1 degrees, and finally finds the possible maximum values a6, a8, and a4 at intervals of 0.05 degrees to obtain the maximum tilt angle of 0.35. This flowchart is shown in FIG. 10.

Figure 10:
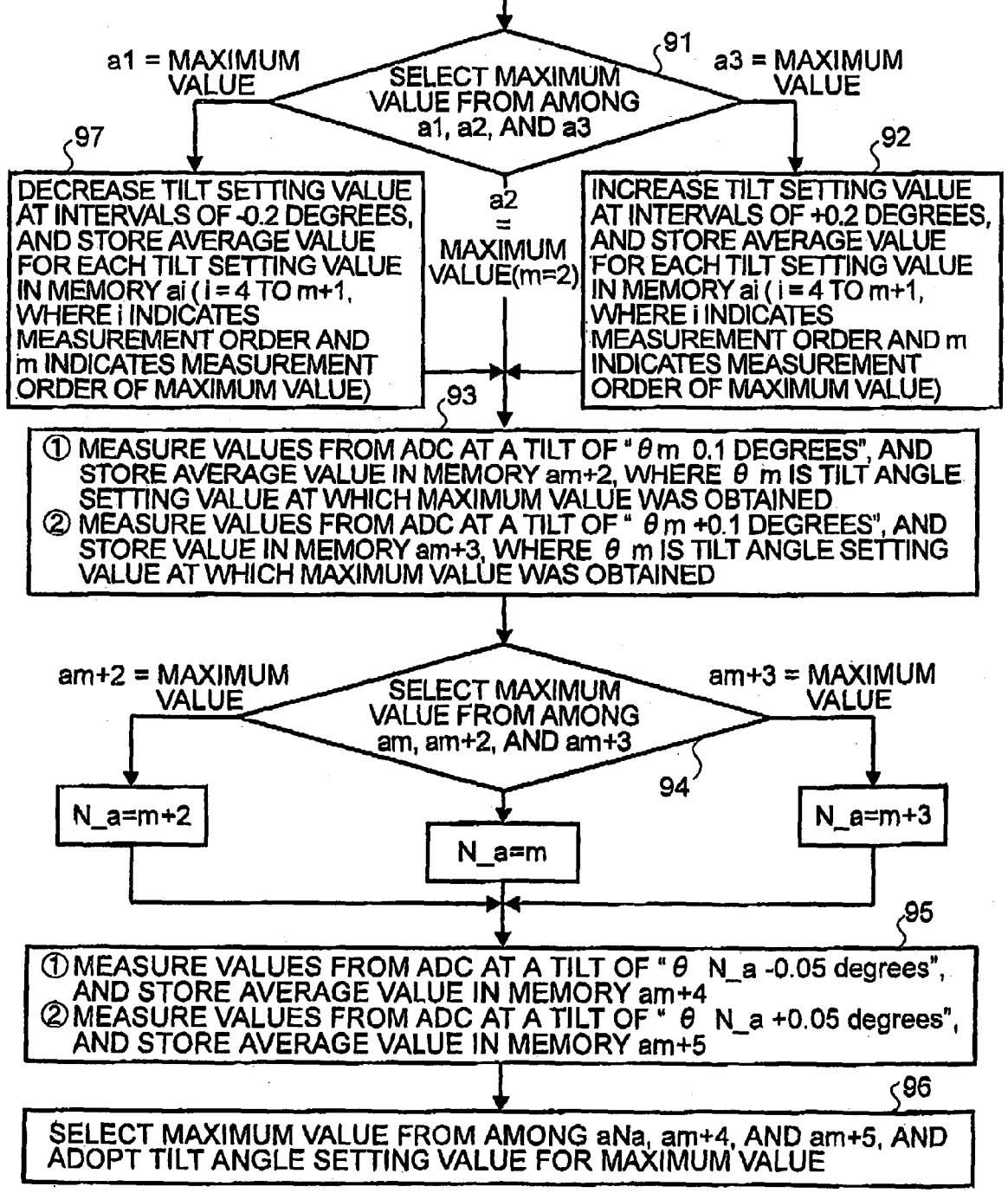
FIG. 10 is a flowchart for processing steps performed by a DPD detecting method to obtain a maximum amplitude value.

FIG. 10 is a flowchart showing processing steps carried out by a DPD detecting method to obtain a maximum amplitude value according to one embodiment of the present invention. First of all, step 90 obtains the average value a1 at a set value of −0.2 degrees, the average value a2 at 0 degree, and the average value a3 at +0.2 degrees. Step 91 selects the highest value of the three. Since a3 has the highest value in the example of FIG. 9, step 92 is subsequently performed. If a1 has the highest value of the three, this means that the maximum amplitude value is to be observed at a tilt angle having a negative value, in contrast with the present example. Therefore, step 97 carries out processing opposite to that of step 92. Referring back to step 92, the average value a4 at +0.4 degrees and the average value a5 at +0.6 degrees are obtained. Thereafter, the average value a4 is determined to have the highest value of the three. Then, step 93 is performed. Step 93 changes the set value by ±0.1 degrees from +0.4 degrees, obtaining a6 at a set value of +0.3 degrees (=0.4−0.1) and a7 at a set value of +0.5 degrees (=0.4+0.1). Step 94 selects the highest value from among the average values a4, a6, and a7. In this example, the average value a4 has the highest value. Step 95 changes the set value by ±0.05 degrees from +0.4 degrees, obtaining the average value a8 at a set value of +0.35 degrees (=0.4−0.05) and the average value a9 at a set value of +0.45 degrees (=0.4+0.05). Step 96 selects the highest value from among the average values a4, a8 and a9. The average value a8 at a tilt angle of 0.35 has the highest value of the three. This is determined to be the maximum value.

Accordingly, the optimum tilt angle is determined as 0.35.

Since this setting method finds the maximum of a parabolic curve, it is generally performed each time the tilt is adjusted. Since the wobble signal is equivalent to the push-pull signal, tilt adjustment for obtaining the maximum value of the wobble signal may be replaced by tilt adjustment for obtaining the maximum value of the push-pull signal.

As described above, the present invention is applied to an optical disk apparatus for converging a laser beam into a small light spot and irradiating it onto an optical disk which is an information recording medium so as to optically record or reproduce information. The present invention can provide an optical disk apparatus capable of making optimum corrections on the tilt of each type of optical disk so as to stably record or reproduce information.

Furthermore, the present invention can prevent the increase in the size of the apparatus by using a lens tilting system. A plurality of tilt detecting systems is switched from one to another on the basis of determination of a disk type and existence of recorded data. Therefore, it is possible to select an optimum tilt control on the basis of determination of a disk type and existence of recorded data, preventing a reduction in reproduction performance caused by a disk tilt.

The above detailed descriptions are provided to illustrate specific embodiments of the present invention and are not intended to be limiting. Numerous modifications and variations within the scope of the present invention are possible. Accordingly, the present invention is defined by the appended claims.

What is claimed is:

1. An optical disk apparatus configured to be compatible with a plurality of disk types, the apparatus comprising:
    an objective lens to focus a laser beam onto an optical disk provided in the apparatus;
    a drive mechanism coupled to the objective lens to enable tilting of the objective lens to a plurality of tilt angles;
    a first signal detection circuit being configured to receive and process a first information signal associated with information read from the optical disk and to output a data signal derived from the first information signal;
    a second signal detection circuit being configured to receive and process a second information signal associated with information read from the optical disk and to generate a push-pull track error signal and a wobble signal;
    a third signal detection circuit being configured to receive and process a third information signal associated with information read from the optical disk and to generate a differential phase track error signal; and
    a digital signal processor to determine a disk type and to perform tilt control of the objective lens to increase the signal strength of the wobble signal derived from the optical disk during a recording operation if the optical disk is determined to be a DVD-R or DVD-RW disk that does not include data written in an information recording area of the optical disk by a user.

2. The optical disk apparatus of claim 1, wherein each of the first, second and third signal detection circuits receive a plurality of the respective information signals.

3. The optical disk apparatus of claim 1, wherein the first signal detection circuit includes first and second bottom detectors to output first and second voltage signals representing bottom values of first and second halves of a Variable-Frequency Oscillator area on the optical disk, wherein the disk tilt selection signal corresponds to a voltage difference between the first and second voltage signals.

4. An optical disk apparatus, comprising:

an objective lens to focus a laser beam onto an optical disk provided for the apparatus;

a drive mechanism coupled to the objective lens to enable tilting of the objective lens to at least two tilt angles;

a first signal detection circuit to receive and process a first information signal derived from reading information from the optical disk and to generate a push-pull track error signal and a wobble signal;

a second signal detection circuit to receive and process a second information signal derived from reading information from the optical disk and to generate a differential phase track error signal; and a digital signal processor coupled to the first and second signal detection circuits and configured to receive the push-pull track error signal, the wobble signal, and the differential phase track error signal, wherein the digital signal processor is configured to process the wobble signal and tilt the lens to increase the signal strength of the wobble signal by driving the drive mechanism if the optical disk is a DVD-R or DVD-RW disk that does not include data written in an information recording area of the optical disk by a user.

5. An optical disk apparatus, comprising:

an optical pickup including an objective lens to focus a laser beam onto an optical disk provided for the apparatus, and a drive mechanism coupled to the objective lens to enable tilting of the objective lens;

a sum signal detection circuit to receive and process a plurality of information signals associated with information read from the optical disk, the detection signal circuit being configured to output a reflected light amount signal and a disk tilt selection signal, wherein the reflected light amount signal provides information about an amount of light reflected from the optical disk to the optical pickup;

a push-pull signal circuit to receive and process the plurality of information signals and output wobble and push-pull signals;

a differential phase signal circuit to receive and process the plurality of information signals and output a differential phase signal; and a digital signal processor configured to receive the reflected light amount signal, the disk tilt selection signal, the wobble signal, the push-pull signal, and the differential phase signal in order to determine a disk format of the optical disk from a plurality of disk formats, wherein the digital signal processor tilt the lens to increase the signal strength of the wobble signal by driving the driving mechanism if the optical disk is determined to be a DVD-R or DVD-RW disk that does not include data written in an information recording area of the optical disk by a user.

6. A method of operating an optical disk apparatus, comprising:

providing an objective lens configured to focus light onto a disk provided for the apparatus, the disk being configured to store information thereon;

receiving a reflected light from the disk;

generating a wobble signal based on the reflected light from the disk;

determining whether or not a disk type of the disk is a DVD-R or DVD-RW disk that includes data written in an information recording area of the disk by a user;

performing a tilt of the lens to increase the signal strength of the wobble signal if the disk is determined to be the DVD-R or DVD-RW disk that does not include data written in the information recording area by a user.

* * * * *